(12) United States Patent
Prakken et al.

(10) Patent No.: US 6,974,299 B2
(45) Date of Patent: Dec. 13, 2005

(54) METHOD AND DEVICE FOR PACKING ARTICLES

(75) Inventors: Bouwe Prakken, Kamerik (NL); Erik Marnix Onno Halsema, Ijsselstein (NL); René Michaël Hoveling, Woerden (NL); Antonius Johannes Van Rootselaar, Bilthoven (NL); Tom Vink, Everdingen (NL)

(73) Assignee: BluePrint Automation B.V., Woerden (NL)

( * ) Notice: Subject to any disclaimer, the term of this patent is extended or adjusted under 35 U.S.C. 154(b) by 34 days.

(21) Appl. No.: 10/471,578

(22) PCT Filed: Mar. 12, 2002

(86) PCT No.: PCT/NL02/00167

§ 371 (c)(1),
(2), (4) Date: Sep. 12, 2003

(87) PCT Pub. No.: WO02/072455

PCT Pub. Date: Sep. 19, 2002

(65) Prior Publication Data

US 2004/0129530 A1    Jul. 8, 2004

(30) Foreign Application Priority Data

Mar. 13, 2001  (NL) .................................. 1017586

(51) Int. Cl.⁷ ............................................. B65G 59/00
(52) U.S. Cl. ................................. 414/791.6; 414/792.1; 198/426; 198/431; 198/447; 198/452
(58) Field of Search ................... 414/791.6, 792.1; 198/426, 431, 433, 447, 448, 452, 453

(56) References Cited

U.S. PATENT DOCUMENTS

| | | | |
|---|---|---|---|
| 1,852,556 A * | 4/1932 | Cramer | 198/431 |
| 2,389,696 A * | 1/1945 | Stiles | 198/452 |
| 3,093,236 A | 6/1963 | McLaughlin | |
| 3,104,753 A * | 9/1963 | Osboune | 198/447 |
| 4,892,182 A * | 1/1990 | Gustafsson | 198/454 |
| 5,423,409 A | 6/1995 | Wipf | 198/367 |
| 5,746,572 A | 5/1998 | Winski | 414/796.3 |

FOREIGN PATENT DOCUMENTS

| | | |
|---|---|---|
| DE | 198 45 836 | 4/2000 |
| FR | 2 494 236 | 5/1982 |

* cited by examiner

Primary Examiner—Richard Ridley
(74) Attorney, Agent, or Firm—Young & Thompson

(57) ABSTRACT

Collection assembly for collecting and stacking articles. The articles are first moved adjacent to one another with the aid of positioning elements. The positioning elements comprise the conveyor belt that extends obliquely with respect to the distribution conveyor and that can be moved over the distribution conveyor to a greater or lesser extent. After bringing the articles into a row on a discharge plate, these are stacked, optionally via a buffer plate, on a lift plate and after the stack has been compressed to some extent this stack is slid into the box in such a way that the products concerned are placed vertically in the box.

6 Claims, 5 Drawing Sheets

METHOD AND DEVICE FOR PACKING ARTICLES

BACKGROUND OF THE INVENTION

The present invention relates to a device for distributing articles over a moving surface, comprising positioning means extending obliquely with respect to the direction of movement of said moving surface and guiding said articles, said positioning means comprising a moving driven belt, guided around a roller close to the free end, for said articles, the direction of movement of said belt having a component that corresponds to the direction of movement of said moving surface and said belt being able to be moved in a direction having a component perpendicular to the direction of movement of said moving surface into a position in which at least one article on said moving surface can still be moved along the free end of the belt.

A device of this type is disclosed in U.S. Pat. No. 5,746,572 A.

Devices of this type are used for placing articles on a conveyor belt in the transverse direction in a specific sequence. Such devices are also known by the general term "lane divider".

In the case of the device described in said U.S. Pat. No. 5,746,572 an auxiliary conveyor belt extending obliquely with respect to the conveyor belt (lane) is disclosed. The engagement surface of said auxiliary conveyor belt has a component of movement in the direction of movement of the main conveyor belt (lane). The auxiliary conveyor belt is provided with two ends: a free end that is positioned a greater or lesser distance over the main conveyor belt and a fixed end. This auxiliary conveyor belt is able to swing about the fixed end.

It has been found that when transporting articles such as bags of crisps or other articles there is a risk that when the free end is moved into a position in which it extends over a larger portion of the main conveyor belt, the bags are subject to turning around the free end. As a result the movement for displacing the articles in the transverse direction with respect to the main conveyor belt is not obtained as desired.

U.S. Pat. No. 3,093,236 discloses a set of auxiliary conveyor belts extending obliquely with respect to the main conveyor, which auxiliary conveyor belts are arranged on either side of the main conveyor. These auxiliary conveyor belts can be moved towards one another in a straight line in order thus to "close off" the main conveyor. As a result all articles on the main conveyor are forced to move to a further main conveyor that extends at an angle with respect to the first main conveyor. In this case it is not movement of articles onto the main conveyor that is concerned, but movement of the articles from the main conveyor.

SUMMARY OF THE INVENTION

The aim of the present invention is to avoid this disadvantage.

This aim is realised with a device as described above in that the free end of said belt can be moved back and forth in the direction of movement of said belt.

As indicated above, the engagement surface extends obliquely with respect to the direction of movement of the distribution conveyor. According to an advantageous embodiment of the invention, this angle is approximately 35°. If a larger angle is chosen, turning of the products, that is to say a rotary movement of the products, can arise in the case of certain products. On the other hand, if the angle becomes too small the desired effect of movement of the products will no longer take place. The various aspects are very highly dependent on the shape and the weight of the product, speed of movement and the like.

According to the present invention the positioning means are preferably controlled in such a way that in the starting position these extend over a large portion of the distribution conveyor. On retraction a series of products lying alongside one another is thus produced. From the retracted position the positioning means are moved into the starting position described above. Retraction takes place relatively quickly. Preferably this speed is so high that the new position is obtained in the length of time between the arrival of two successive products. The additional movement can be conducted at much lower speed.

Using the device described above a movement of, for example, 140 steps per minute, that is to say 140 products per minute, is achievable using the positioning means. With this arrangement the retraction, that is to say withdrawal, of the positioning means from the distribution conveyor takes place at a speed of, for example, 3 m/s and an acceleration of 40 m/s$^2$. Movement with a larger surface over the distribution conveyor can be carried out at a speed of 1 m/s and an acceleration of 4 m/s$^2$.

The engagement surface of the positioning means can comprise any construction known in the state of the art, such as wheels, ball bearings and the like. These then may or may not be driven. According to an advantageous embodiment, the positioning means comprise a positioning belt that is driven in such a way that the products are as far as possible moved in the direction of movement of the distribution conveyor. Because of the existence of as small as possible a difference in speed between the positioning means and the distribution conveyor, turning of articles on the distribution conveyor can be prevented. The various aspects are, of course, highly dependent on the speed and the shape of the article. By moving the positioning means in this way it is possible to prevent these engaging an article in an undesired manner.

The invention also relates to an assembly comprising a distribution conveyor with positioning means as described above, as well as a collection/deposition device comprising a discharge plate that can be moved essentially in the direction of movement of said distribution conveyor, as well as a stop for retaining said articles and allowing said plate to pass by. That is to say, the articles positioned alongside one another are (successively) placed on the discharge plate that forms part of the collection/deposition device and, if a row is full, the discharge plate is moved, essentially in the opposite direction to that of the distribution conveyor, underneath said distribution conveyor past a stop plate, during which operation the products placed in a row will drop downwards under the effect of gravity.

According to an advantageous embodiment of the invention, these products first drop onto a buffer plate. It is, for example, possible to store two series of horizontal rows of products in the vertical direction on the buffer plate. According to an advantageous embodiment of the invention the products are then transferred to a lift plate. The lift plate is loaded until a sufficient number of series are on top of one another in order, for example, to be able to fill a box or the like. The series of rows are then preferably compressed somewhat with such a lift plate, as a result of which introduction into a box or the like is facilitated and a separate device provides for displacement of the series of rows of articles. Such displacement preferably takes place in the horizontal direction. That is to say, a box or other storage medium is positioned with the opening thereof in the vertical plane. During this operation for placing articles in a box or the like, the buffer device can temporarily collect the continuing stream of articles originating from the discharge device.

It must be understood that the mechanism of the collection/deposition device described above can also be used in combination with other devices for distributing articles over a horizontal surface. After all, it is quite possible that the articles are in line on the distribution device in a direction perpendicular to the direction of movement of the distribution device, so that they pass simultaneously or essentially simultaneously onto the discharge plate.

BRIEF DESCRIPTION OF THE DRAWINGS

The invention will be explained in more detail below with reference to an illustrative embodiment shown in the figures. In the figures.

DESCRIPTION OF THE PREFERRED EMBODIMENTS

Figure 1:
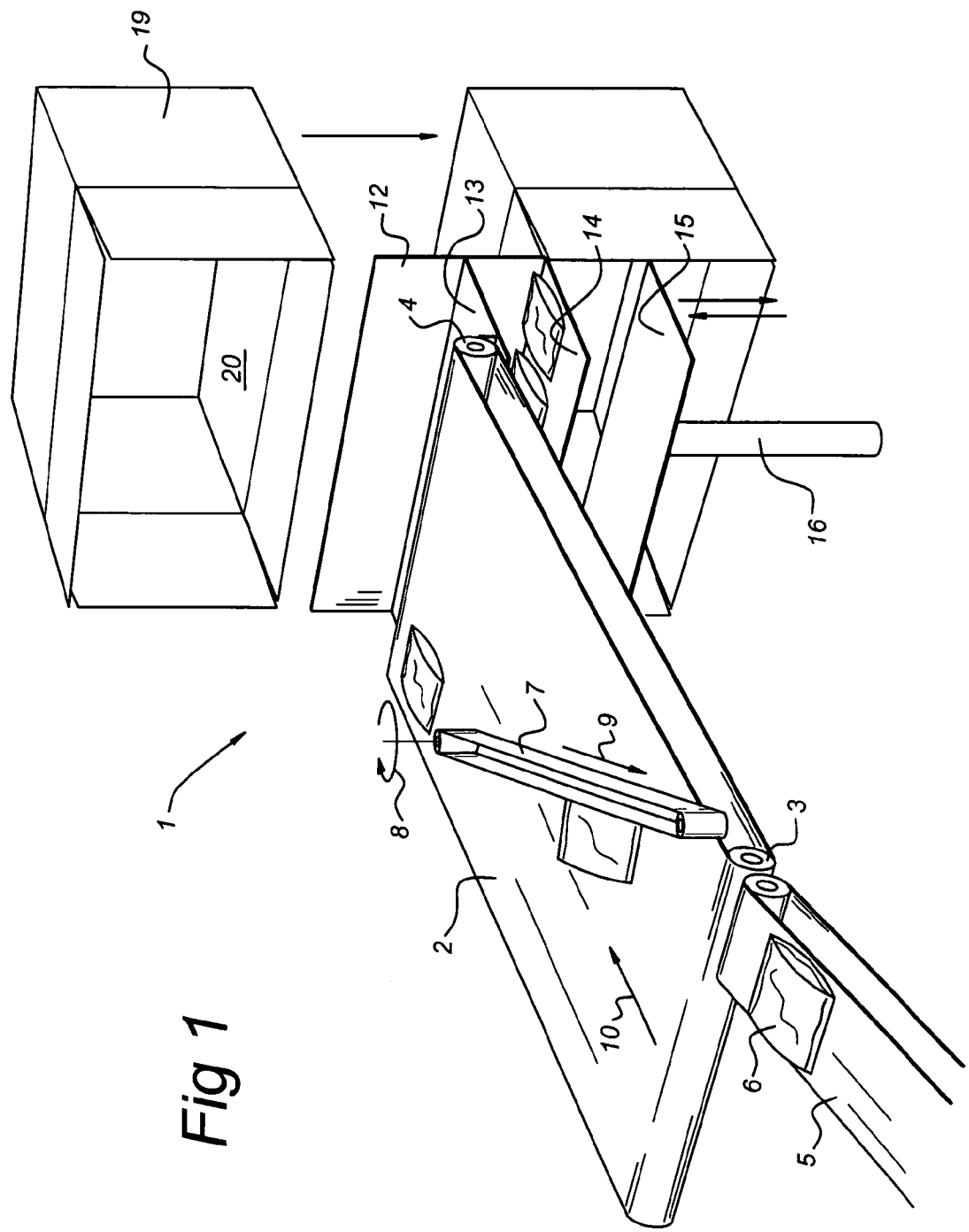
FIG. 1 shows, highly diagrammatically, a perspective view of the device according to the invention with the positioning means in a first position.

In FIG. 1 the assembly according to the invention is indicated by 1. This consists of a distribution conveyor 2 that is able to circulate, in a manner not shown in more detail, around the shafts 3 and 4. Furthermore, there is a construction, that is not shown, by means of which shaft 4 can be moved in the horizontal direction. The direction of movement of distribution conveyor 2 is indicated by arrow 10.

5 indicates a feed conveyor via which articles 6 are fed. 7 indicates a positioning belt which executes a rotary movement according to arrow 8. This entire positioning belt 7 can be moved in accordance with arrow 9. Preferably the movement takes place with the aid of a servomechanism, but it is also possible to control the various features pneumatically or hydraulically.

In FIG. 1 a discharge plate is indicated by 13 and a stop plate by 12. By varying the position of shaft 4 the distance between the deposition point of the distribution conveyor 2 and the stop plate 12 can be varied, which means that shorter or longer articles can be positioned on the discharge plate 13.

In FIG. 1 the position is shown in which the positioning belt 7 extends a long way over the distribution belt 2. In this position the products 6 are moved along the positioning belt 7. The engagement surface thereof moves at a speed that has a component in the longitudinal direction which essentially corresponds to the speed of movement in the longitudinal direction of the distribution belt 2. The angle that the positioning belt 7 makes with the direction of movement of distribution conveyor 2 is approximately 35°.

Article 6 is also able to move along 7 when the step change is made. The difference is that 6 is released from 7 at an earlier point in time.

Figure 2:
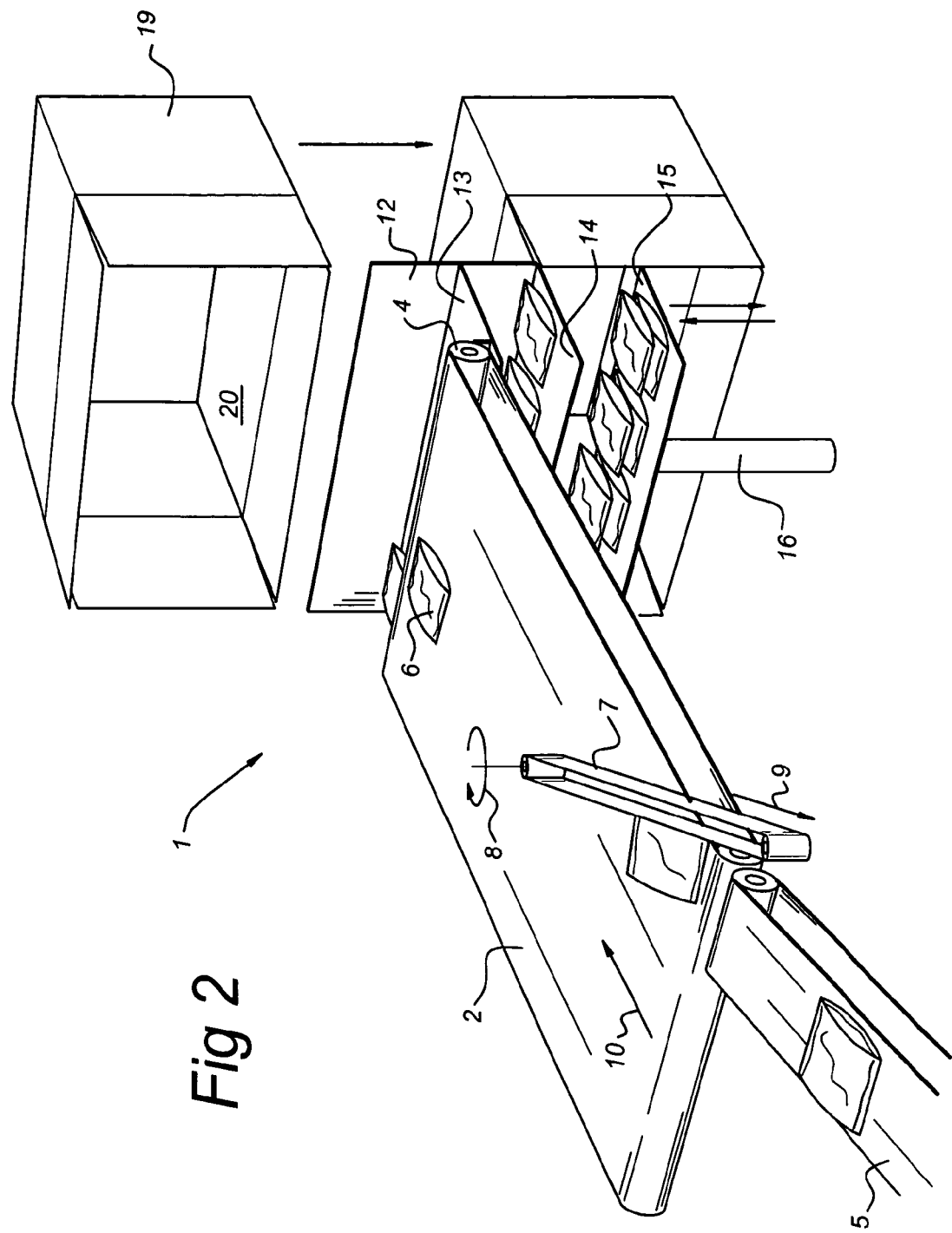
FIG. 2 shows the device according to FIG. 1 with positioning means in a second position.
Figure 3:
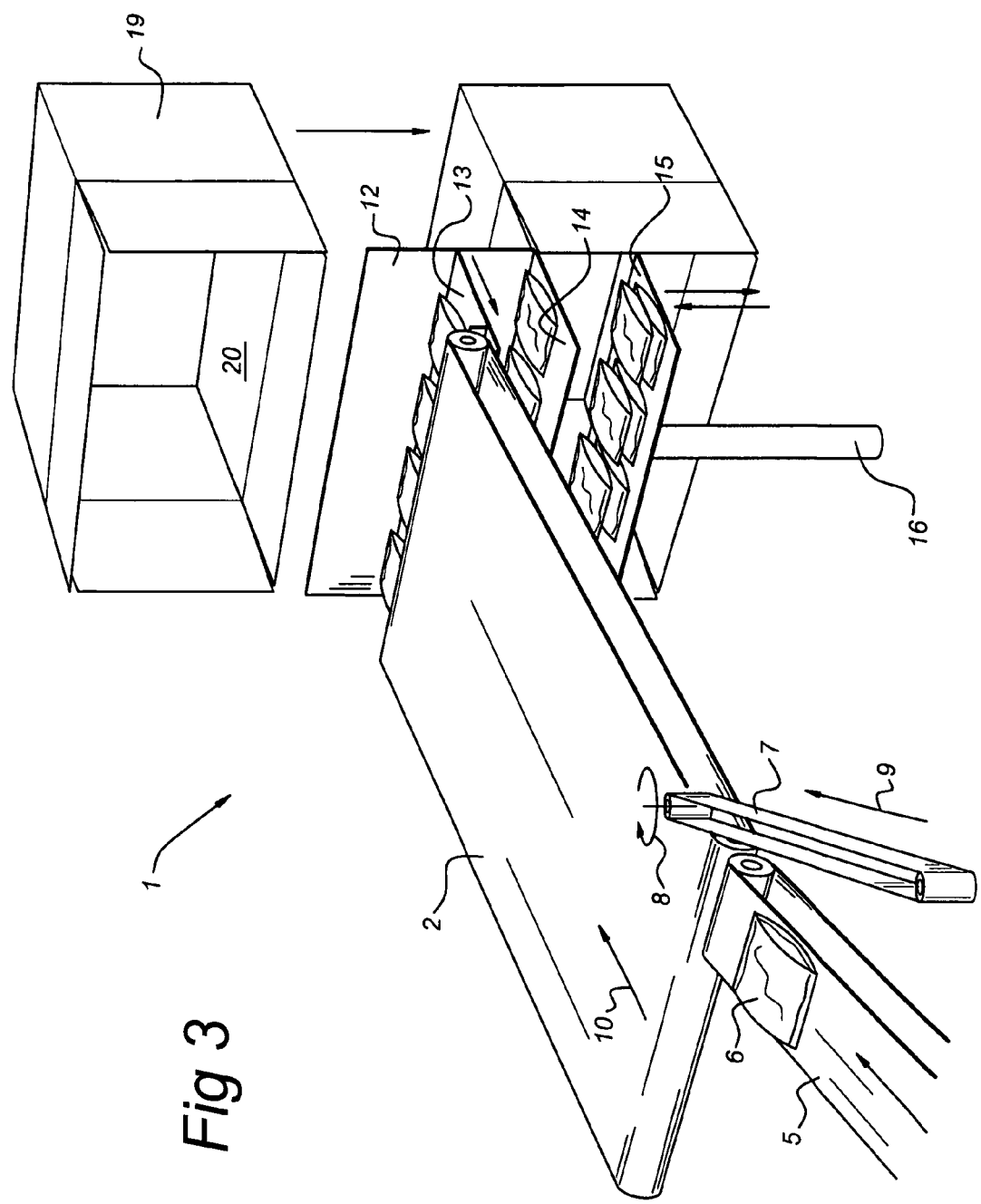
FIG. 3 shows the device according to FIG. 1 with the positioning means in a third position.

Subsequently, as can be seen from FIG. 2, as the next article 6 approaches positioning belt 7 is retracted one step with the aid of the servo device or the like. Preferably retraction takes place at such a speed that the new position is assumed before the next article 6 reaches the positioning belt. As a result, this next article 6 will be positioned adjacent to the previous article 6. In FIG. 3 the next position shown is the position in which positioning belt 7 has been brought furthest inwards. If the positioning belt executes such a movement, a full row of articles 6 can be positioned alongside one another on the discharge plate 13. After the end position shown in FIG. 3 has been reached, the positioning belt 7 will move rapidly, that is to say at a speed of movement of the free front end such that a product moving on the distribution belt 2 does not pass beyond this front end, into the position in FIG. 1 where it will come to a halt. The rotary movement of the belt 7 is maintained during this operation. The speed of movement for moving from the position shown in FIG. 3 into the position in FIG. 1 will in general be much lower than the retracting movement of the front of positioning belt 7 that has been described above. After all, time is available for transporting the article further downstream. The article 6 then moves on and reaches the furthest left position on the discharge plate.

A row of articles can be formed continuously in this way.

Figure 4:
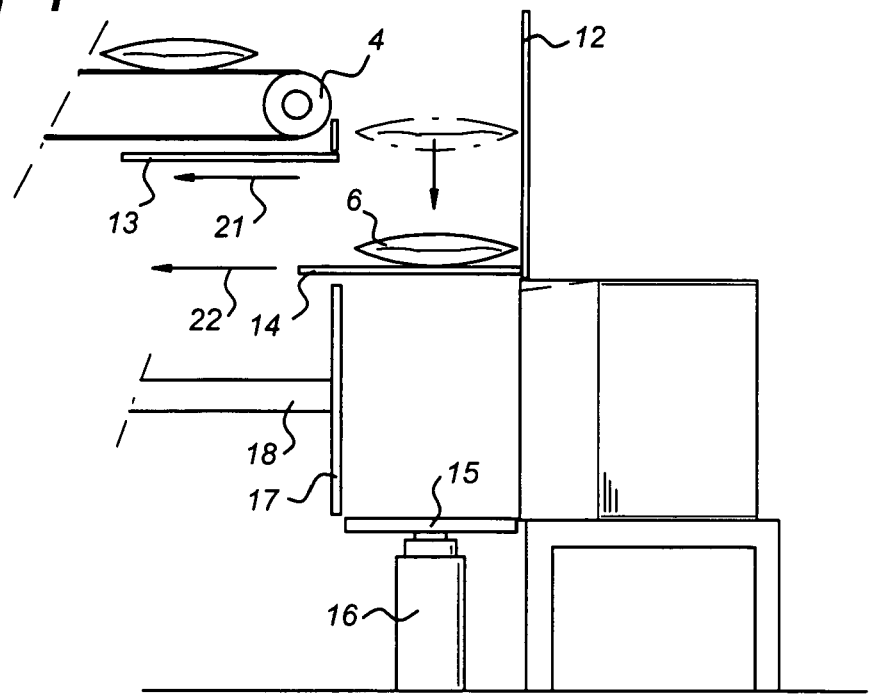
FIG. 4 shows a side view of the collection/deposition device when removing the first series of products.
Figure 5:
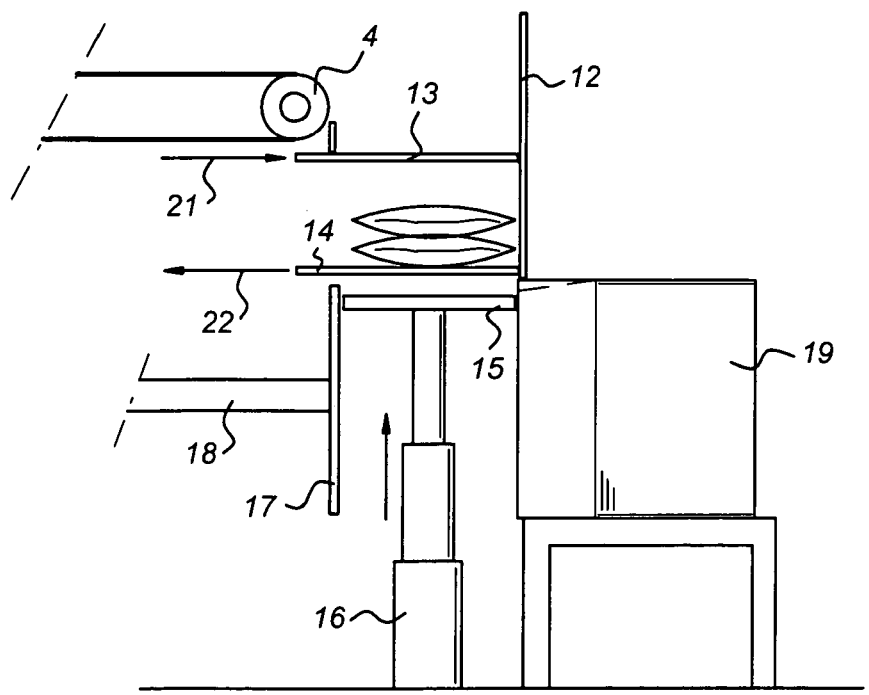
FIG. 5 shows the device according to FIG. 4 when the buffer device is full.
Figure 6:
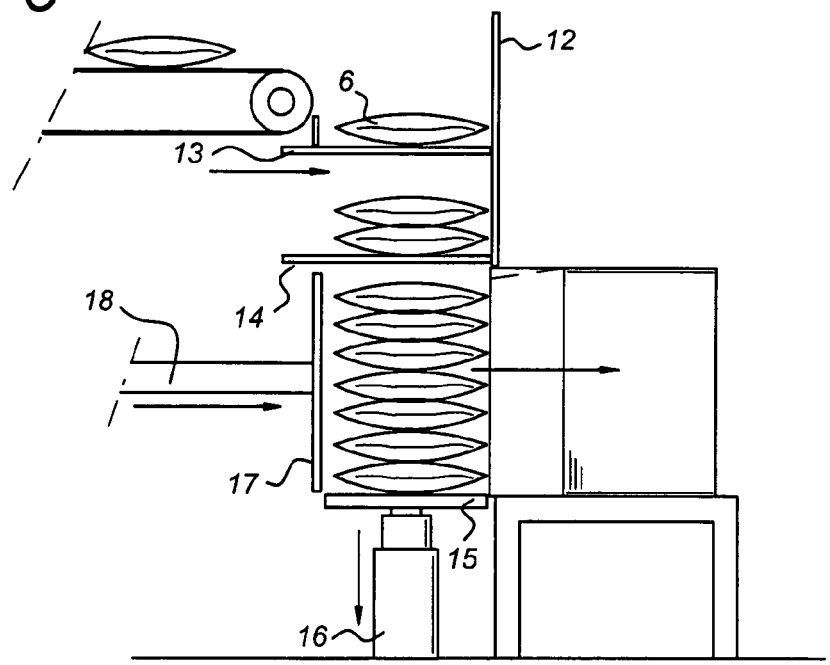
FIG. 6 shows the device according to FIG. 4 when filling a box.

The collection/deposition device is shown in side view in FIGS. 4–6. This device consists of the discharge plate 13 described above, which can be moved in the direction of arrow 21. A buffer plate 14, which can be moved in the direction of arrow 22, is located beneath said discharge plate 13. A lift plate 15, the height of which is adjustable with the aid of a control 16 shown diagrammatically, is located beneath said buffer plate 14. In addition there is a pusher plate 17 that can be moved by control 18. A feed for boxes 19, such that the opening 20 thereof is essentially vertical, is shown in FIGS. 1 and 2.

Starting from the point at which a series of articles 6 is positioned on discharge plate 13, this discharge plate 13 is moved to the left in the direction of arrow 21 as shown in FIG. 4. As a result the row of articles drops down over a distance twice the height thereof onto the buffer plate 14. Damage to packaging and product, such as snacks and more particularly crisps, is avoided as a result of this small drop.

A similar operation then takes place again until two series of rows of articles are on the buffer plate 14. Thereafter, or even before this, the lift plate 15 is moved upwards and the two series of rows of articles are transferred when buffer plate 14 is moved in the direction of arrow 22. The buffer plate remains in the open position until a series of rows of products corresponding to the desired number of products to be placed in the box 19 is present on the lift plate 15. This is shown in FIG. 6. The buffer plate then moves into the closed position. Some compression of the series of rows of products is then carried out with the aid of control 16. This is, of course, dependent on the product concerned. The articles are pressed against the closed buffer plate to some extent. The lifting device 16 is then moved back somewhat so that pusher plate 17 can push the series of rows of products to the right into box 19 with the aid of control 18. In the interim, buffer plate 14 is filled in the manner described above. In this way it is possible to fill boxes with products continuously. These will be placed "upright" in the boxes. It is also possible to place two layers of products standing on top of one another in box 19. The device shown here can be of particularly compact construction.

Figure 7:
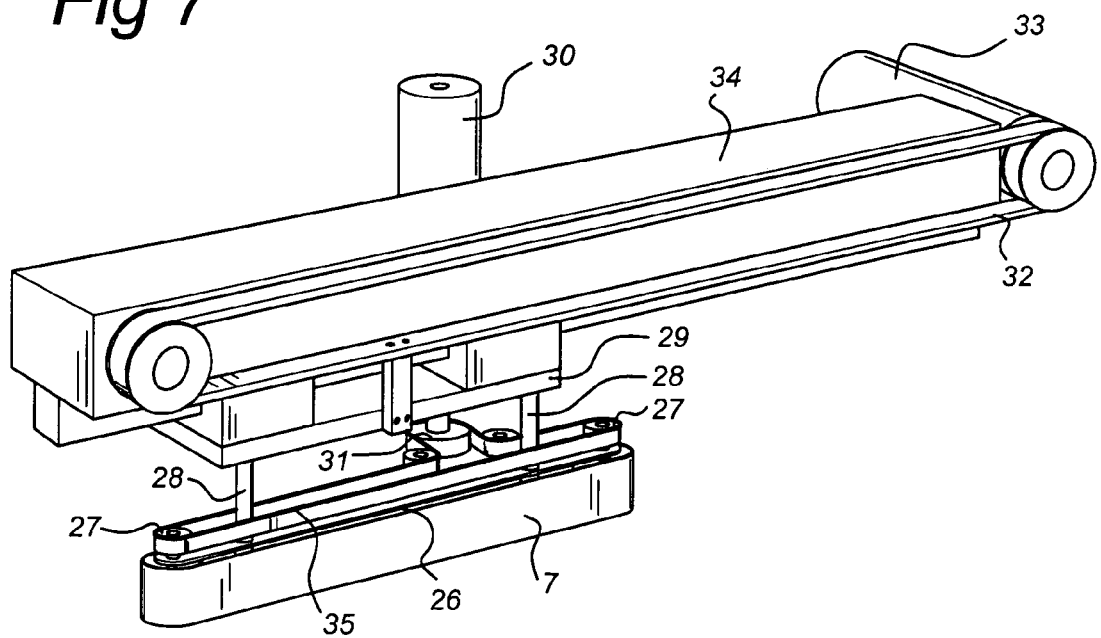
FIG. 7 shows the mechanical construction of the positioning belt 7.

In the above figures the positioning belt 7 is always shown diagrammatically. A practical embodiment thereof is shown highly diagrammatically in FIG. 7. The positioning belt 7 runs on two rollers 27 which are a fixed distance apart and rotate freely in frame 26. Frame 26 is joined via columns 28 to a movable carriage 29.

Rollers 27 are driven by belt 35 which, in turn, is driven by the pulley 31 of a fixed motor 30, shown only in part. As carriage 29 moves back and forth the drive pulley 31 of fixed motor 30 is in different positions with respect to frame 26.

Carriage 29, and thus belt 7, are moved back and forth with the aid of a belt 32 that is driven by a servomotor 33. Servomotor 33 is on the fixed frame 34. As a result of moving belt 32 back and forth carriage 29, and thus frame 26 and consequently belt 7, move back and forth. The relatively heavy motor 30 is fixed, as a result of which the servomotor 33 can be of relatively lightweight construction. Movement of the slider 29 has no effect on movement of belt 35, that is to say belt 7. That is to say, the speed of the belt 7 remains constant during movement of said belt 7 with respect to the horizontal transport surface.

Using the present invention it is also possible to place products offset with respect to one another. This can be effected by appropriate control of the positioning belt. Further variants will be immediately apparent to those skilled in the art on reading the above description and fall within the scope of the appended claims.

What is claimed is:

1. Device for distributing articles over a moving surface, comprising;
   a moving driven belt extending obliquely with respect to a direction of movement of a moving surface and guiding articles on the moving surface,
   said belt being guided around a roller close to a free end, a direction of movement of said belt having a component that corresponds to the direction of movement of said moving surface,
   said roller being movable obliquely, in the direction of movement of said belt, into a position in which at least one article on said moving surface can move around the free end,
   wherein said belt is fitted on a movable frame, and
   further comprising two separate motors, one of said motors for driving said belt and another of said motors for moving the frame.

2. Collection assembly comprising:
   a device for distributing articles over a moving surface that comprises a moving driven belt extending obliquely with respect to a direction of movement of a moving surface and guiding articles on the moving surface,
   said belt being guided around a roller close to a free end, a direction of movement of said belt having a component that corresponds to the direction of movement of said moving surface,
   said roller being movable obliquely, in the direction of movement of said belt, into a position in which at least one article on said moving surface can move around the free end; and
   a collection/deposition device for receiving and then depositing articles received from said moving surface, wherein said collection/deposition device comprises a discharge plate that can be moved in a direction opposed to the direction of movement of said moving surface,
   the collection assembly further comprising a buffer device for receiving said articles from said collection/deposition device, which buffer device comprises a buffer plate arranged below said discharge plate.

3. Collection assembly comprising:
   a device for distributing articles over a moving surface that comprises a moving driven belt extending obliquely with respect to a direction of movement of a moving surface and guiding articles on the moving surface,
   said belt being guided around a roller close to a free end, a direction of movement of said belt having a component that corresponds to the direction of movement of said moving surface,
   said roller being movable obliquely, in the direction of movement of said belt, into a position in which at least one article on said moving surface can move around the free end; and
   a collection/deposition device for receiving and then depositing articles received from said moving surface, wherein said collection/deposition device comprises a discharge plate that can be moved in a direction opposed to the direction of movement of said moving surface,
   the collection assembly further comprising a lift plate arranged to support a stack of articles originating from said collection/deposition device, which lift plate is constructed such that it is able to move vertically.

4. A device for distributing articles over a moving surface, comprising;
   a belt assembly having a first belt that is guided around two rollers that define a longitudinal axis of said belt assembly, the longitudinal axis extending obliquely across a direction of movement of the moving surface, said first belt being arranged and adapted to guide articles on the moving surface; and
   a movable carriage from which said belt assembly depends and that moves said belt assembly back and forth along the longitudinal axis so that an end of said belt assembly over the moving surface defines a location of an article on the moving surface.

5. The device of claim 4, further comprising a frame with a second belt that is aligned parallel to the longitudinal axis and to which said movable carriage is attached so that said belt assembly moves relative to said frame.

6. The device of claim 5, further comprising a motor that is attached to said frame and drives said first belt, wherein a location of said motor relative to said belt assembly changes as said movable carriage moves.

* * * * *